US012763424B2

(12) United States Patent
Lenz et al.

(10) Patent No.: US 12,763,424 B2
(45) Date of Patent: Oct. 13, 2026

(54) BATTERY SHELL, TRACTION BATTERY, MOTOR VEHICLE, AND METHOD FOR MANUFACTURING A BATTERY SHELL

(71) Applicant: Kautex Textron Gmbh & Co. KG, Bonn (DE)

(72) Inventors: Stefan Lenz, Bergisch-Gladbach (DE); Georg Enkirch, Salz (DE); Ibrahim Koukan, Cologne (DE); Stefan Trötschel, Bonn (DE)

( * ) Notice: Subject to any disclaimer, the term of this patent is extended or adjusted under 35 U.S.C. 154(b) by 316 days.

(21) Appl. No.: 17/911,229

(22) PCT Filed: Jan. 6, 2021

(86) PCT No.: PCT/EP2021/050117
§ 371 (c)(1),
(2) Date: Sep. 13, 2022

(87) PCT Pub. No.: WO2021/190791
PCT Pub. Date: Sep. 30, 2021

(65) Prior Publication Data

US 2023/0103100 A1 Mar. 30, 2023

(30) Foreign Application Priority Data

Mar. 26, 2020 (DE) ......................... 102020108442.0

(51) Int. Cl.
*H01M 50/317* (2021.01)
*H01M 50/147* (2021.01)
(Continued)

(52) U.S. Cl.
CPC ....... *H01M 50/317* (2021.01); *H01M 50/147* (2021.01); *H01M 50/394* (2021.01); *H01M 50/308* (2021.01); *H01M 2220/20* (2013.01)

(58) Field of Classification Search
CPC ............. H01M 50/317; H01M 50/147; H01M 50/394; H01M 50/308; H01M 2220/20; H01M 50/342
See application file for complete search history.

(56) References Cited

U.S. PATENT DOCUMENTS 3,507,708 A 4/1970 Vignaud
6,562,517 B1 * 5/2003 Misra ................. H01M 50/394 429/57

(Continued)

FOREIGN PATENT DOCUMENTS

CN 205881961 U 1/2017
CN 205992562 U 3/2017

(Continued)

OTHER PUBLICATIONS

Engel et al. (WO2016146216 A1 and using machine translation as English version) (Year: 2016).*

(Continued)

*Primary Examiner* — Wyatt P McConnell
*Assistant Examiner* — Joshua P McClure
(74) *Attorney, Agent, or Firm* — Young Basile Hanlon & MacFarlane, P.C.

(57) ABSTRACT

A battery shell, in particular, a battery shell for a traction battery of a motor vehicle, comprises a semi-permeable membrane that is integrally bonded or frictionally connected to the battery shell.

14 Claims, 8 Drawing Sheets

Figure 1:
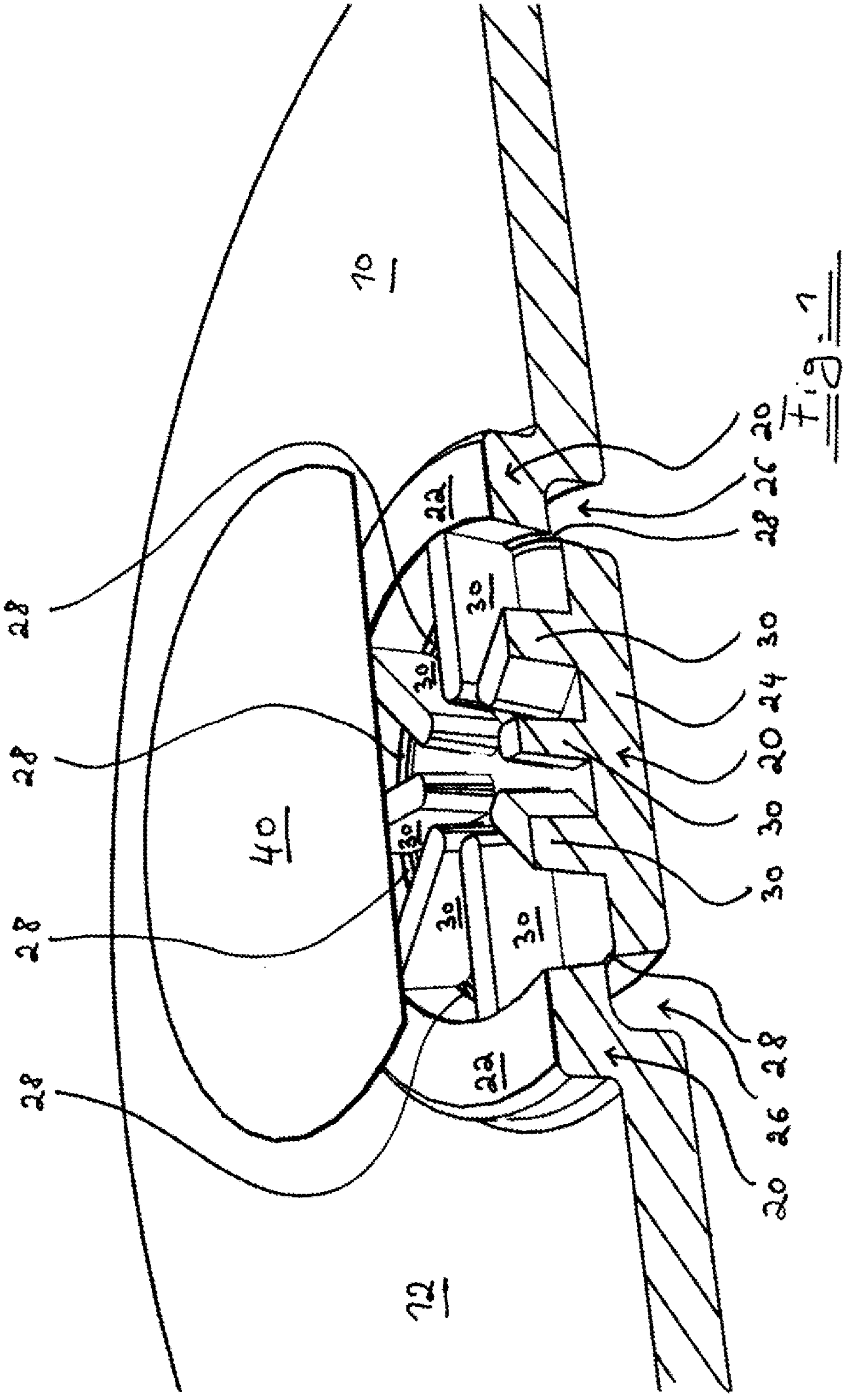

(51) Int. Cl.
*H01M 50/30* (2021.01)
*H01M 50/308* (2021.01)

(56) References Cited

U.S. PATENT DOCUMENTS

| | | | | |
|---|---|---|---|---|
| 8,413,496 | B2 * | 4/2013 | Eslami | G01L 19/0636 73/114.43 |
| 2002/0028606 | A1 * | 3/2002 | Fossati | H01M 50/308 439/627 |
| 2006/0188779 | A1 | 8/2006 | Yoppolo et al. | |
| 2012/0247338 | A1 * | 10/2012 | Bauer | B01D 63/14 29/446 |
| 2013/0032219 | A1 * | 2/2013 | Heim | H01M 50/3425 137/197 |
| 2021/0396324 | A1 * | 12/2021 | Nakayama | H01M 50/394 |

FOREIGN PATENT DOCUMENTS

| | | | | |
|---|---|---|---|---|
| DE | 1704929 | A1 | 2/1971 | |
| DE | 102012022346 | A1 | 5/2014 | |
| DE | 202015005264 | U1 | 4/2016 | |
| DE | 202019100048 | U1 | 1/2019 | |
| EP | 3046161 | A1 | 7/2016 | |
| EP | 3271956 | A1 | 1/2018 | |
| WO | WO-2016146216 | A1 * | 9/2016 | H01M 2/1241 |
| WO | WO-2017178564 | A1 * | 10/2017 | H01M 2/0237 |
| WO | WO-2018183804 | A1 * | 10/2018 | F16K 15/148 |

OTHER PUBLICATIONS

Draexlmaier et al. (DE202019100048(U1) as cited in IDS and using Machine Translation as English version) (Year: 2019).*

Klavdija et al. (WO2017178564(A1) and using Machine Translation as English version) (Year: 2017).*

International Search Report, PCT Application No. PCT/EP2021/050117, mailed May 31, 2021 (7 pages).

* cited by examiner

BATTERY SHELL, TRACTION BATTERY, MOTOR VEHICLE, AND METHOD FOR MANUFACTURING A BATTERY SHELL

CROSS REFERENCE TO RELATED APPLICATIONS

This application is a 371 National Stage application of International Application No. PCT/EP2021/050117, filed Jan. 6, 2021, which claims the benefit of the filing date of German patent application 10 2020 108 442.0, filed Mar. 26, 2020, the contents of which are hereby incorporated by reference in their entireties.

This patent application claims the priority of German patent application 10 2020 108 442.0, the disclosure of which is hereby explicitly referred to.

The present invention relates to a battery shell, a traction battery, a motor vehicle and a method for manufacturing a battery shell.

A battery, in particular a traction battery for storing energy in a motor vehicle, consists of a multiplicity of component parts. One of the tasks of a battery housing is to fasten and protect battery modules and other required components.

The use of the battery and/or the ambient conditions and/or a fault in a battery cell and/or extreme operating conditions and/or changes in the volume of components installed in the battery housing can result in pressure changes and associated pressure differences between the volume enclosed by the battery housing and the surroundings of the battery housing.

In particular, pressure changes can be caused by temperature fluctuations, in particular by a change in the ambient temperature and/or the temperature inside the battery housing. Furthermore, pressure changes may be caused by weather changes and/or changes in the battery's elevation above sea level. Degassing of a battery cell, in particular in response to a thermal overload of the battery, can also lead to a change in pressure.

In order to avoid dangers for the structure of the battery housing due to a pressure change that occurs, a battery housing requires aeration and ventilation, which allows the reduction of pressure differences due to pressure changes that occur.

The object of the invention is that of providing an improvement over or an alternative to the prior art. In particular, the invention describes a technical solution for a safe, durable, sealed and cost-effective integration of one or more ventilation elements in a battery housing.

According to a first aspect of the invention, the object is achieved by a battery shell, in particular a battery shell of a traction battery, the battery shell being formed from a plastics material, the battery shell having a semi-permeable membrane, the semi-permeable membrane being designed to be permeable to a gaseous substance and impermeable to a liquid substance, the battery shell having a receiving geometry for the semi-permeable membrane, the receiving geometry having a ventilation opening, the receiving geometry being designed for connection to the semi-permeable membrane, and the semi-permeable membrane being integrally bonded or frictionally connected to the battery shell.

In this regard, the following is explained conceptually:

It should first be expressly noted that in the context of the present patent application, indefinite articles and numbers such as "one," "two," etc. should generally be understood as "at least" statements, i.e., as "at least one . . . ," "at least two . . . ," etc., unless it is clear from the relevant context or it is obvious or technically imperative to a person skilled in the art that only "exactly one . . . ," "exactly two . . . ," etc. can be meant.

In the context of the present patent application, the expression "in particular" should always be understood as introducing an optional, preferred feature. The expression should not be understood to mean "specifically" or "namely."

A "battery shell" is understood to mean a housing part of a battery, in particular a traction battery. In particular, a battery shell is designed to receive components of a battery so that they can be protected from outside influences and/or at least indirectly fastened by the battery shell.

A battery shell is preferably understood to mean a lower battery shell or an upper battery shell, the lower battery shell, in contrast to the upper battery shell, comprising means for fastening components of the traction battery.

A "traction battery" is understood to mean an energy storage device, in particular an energy storage device for electrical power. A traction battery is preferably suitable for installation in and for driving electric cars. A traction battery is preferably suitable for use in a battery-electric motor vehicle and/or a motor vehicle having a battery-electric drive and an internal combustion engine.

A "plastics material" is understood to mean a material that mainly consists of macromolecules.

A plastics material is preferably a thermoplastic material, whereby a thermoplastic material is deformable in a material-dependent temperature range, this process being reversible and being repeatable as often as desired by cooling and reheating to the molten state.

A plastics material is preferably understood to mean a polyamide 6. The polyamide 6 particularly preferably has glass fiber reinforcement.

A "semi-permeable membrane" is understood to mean a partially permeable wall which allows particles having a size below a size defined depending on the membrane to pass through the semi-permeable membrane, while particles having a size greater than this membrane-dependent size cannot pass through the membrane.

A semi-permeable membrane is preferably understood to mean a membrane which allows gas exchange, in particular air exchange, while the membrane is not permeable to liquids, in particular water, at least up to a membrane-dependent pressure difference between the two surfaces of the membrane, in particular up to a pressure difference of 1.5 bar, preferably up to a pressure difference of 2.0 bar, particularly preferably up to a pressure difference of 3.0 bar.

The semi-permeable membrane is preferably designed in such a way that a gas volume flow of greater than or equal to 1 l/min is possible at an overpressure inside the battery shell of up to 5 mbar, in particular at an overpressure inside the battery shell of up to 20 mbar.

The semi-permeable membrane is preferably designed in such a way that it prevents a liquid substance from flowing through into the battery shell in the case of an overpressure on the outer side of the battery shell of up to 300 mbar.

A "gaseous substance" or a gas is understood to mean a substance in the gaseous state of aggregation. A gaseous substance is preferably understood to mean a gas mixture which corresponds to the composition of air or resembles the composition of air.

A "liquid substance" or a liquid is understood to mean a substance in the liquid state of aggregation. A liquid substance is preferably understood to mean water or a composition of substances which resembles water.

A "receiving geometry" is understood to mean a region of the geometry of the battery shell that is designed to receive one or more semi-permeable membranes. In particular, the receiving geometry has a region which is designed to be integrally bonded or frictionally connected to a semi-permeable membrane. Furthermore, the receiving geometry has in particular one or more ventilation openings.

The receiving geometry is preferably formed monolithically with the battery shell.

The receiving geometry is preferably designed to be connected indirectly or directly to the semi-permeable membrane.

The receiving geometry is preferably directly integrally bonded or frictionally connected to the semi-permeable membrane.

The receiving geometry is preferably designed to receive a parasol mushroom valve and/or a semi-permeable membrane.

A "parasol mushroom valve" is understood to mean a valve whose shape is reminiscent of a parasol mushroom. A parasol mushroom valve is designed to be closed at a low differential pressure and to prevent a flow. A parasol mushroom valve is also designed to open when a defined opening pressure difference is exceeded, so that a flow through the valve is allowed, and to close again when the pressure falls below a defined closing pressure difference, so that a flow through the parasol mushroom valve is prevented. A parasol mushroom valve is preferably designed so that, when an opening pressure difference is exceeded, a flow can take place only in one flow direction, so that the opening pressure difference only causes opening when the lower pressure acts on the intended side of the parasol mushroom valve. A parasol mushroom valve preferably prevents a backflow in the opposite direction of the flow when the parasol mushroom valve is opened. A parasol mushroom valve is advantageously a purely passive component.

A parasol mushroom valve is preferably form-fittingly connected to the receiving geometry and/or the membrane carrier.

The parasol mushroom valve is preferably designed in such a way that it opens when there is an overpressure of 100 mbar inside the battery shell. The parasol mushroom valve is preferably designed in such a way that it allows a maximum volume flow of 150 l/s in a pressure range between 100 mbar and 100,000 mbar.

The parasol mushroom valve is preferably designed in such a way that it prevents a flow from flowing into the battery shell in the case of an overpressure on the outer side of the battery shell of up to 300 mbar.

A parasol mushroom valve is preferably formed from an elastomer.

A parasol mushroom valve can advantageously be used to ventilate the battery shell at high internal battery pressures, as a result of which the structural integrity of the battery shell can be ensured, particularly in the event of a thermal escalation of a battery module.

A receiving geometry is preferably designed to be covered with a protective cover. A protective cover is preferably electrically conductive. A protective cover is preferably designed to improve the electromagnetic compatibility of the battery shell, in particular in that the region of the battery shell through which a flow can pass is shielded from electromagnetic radiation by means of the protective cover.

The protective cover is preferably frictionally and/or form-fittingly connected to the receiving geometry, in particular using a latching element. The protective cover is preferably crimped onto the receiving geometry.

A protective cover preferably has a contacting element, the contacting element being designed to contact the protective cover with a different region, which is designed to improve the electromagnetic compatibility of the battery shell.

A protective cover preferably has a bursting means.

The receiving geometry preferably has a protective region which is designed to protect the semi-permeable membrane and/or the parasol mushroom valve from unwanted damage caused by loads acting on the semi-permeable membrane and/or the parasol mushroom valve, in particular from loads acting from outside and/or from the inside on the battery shell. Such loads can be caused in particular by foreign objects or liquids that can come into contact with the battery shell. Foreign bodies should be thought of in particular as also including stones or clumped dirt. Liquids should be thought of in particular as water or an operating liquid of a motor vehicle.

Preferably, the receiving geometry is indirectly integrally bonded or frictionally connected to the semi-permeable membrane, in particular by means of a membrane carrier, whereby this is understood to mean that the receiving geometry is directly connected to a membrane carrier, in particular is frictionally and/or form-fittingly connected to the membrane carrier, which in turn is directly integrally bonded or frictionally connected to the semi-permeable membrane.

A "membrane carrier" is understood to mean a component which is designed to be directly integrally bonded or frictionally connected to the semi-permeable membrane. Preferably, a membrane carrier can be integrally bonded or frictionally connected to a plurality of semi-permeable membranes. A membrane carrier preferably has a parasol mushroom valve.

A membrane carrier is preferably frictionally and/or form-fittingly connected to the receiving geometry.

A membrane carrier is preferably formed from polyethylene (PE) or polyoxymethylene (POM) or polyamide (PA).

A membrane carrier is preferably sealed off from the receiving geometry of the battery shell by a sealing means.

A "ventilation opening" should be thought of as an opening in the receiving geometry which is designed for aeration and/or ventilation of at least one side of the semi-permeable membrane, so that the semi-permeable membrane can bring the gas volume inside a battery housing, which has the battery shell, into connection with the gas volume surrounding the battery housing, so that a gas exchange can take place via the semi-permeable membrane between the gas volume inside the battery housing and the gas volume surrounding the battery housing.

An "integral bond" is understood to mean a connection between two connection partners in which the two connection partners are held together by atomic or molecular forces.

A connection brought about by welding or gluing or vulcanizing or soldering is preferably an integral bond.

A "frictional connection" is understood to mean a connection between two connection partners in which a normal force acts between the connection partners and the relative movement of the connection partners can be prevented by static friction.

A "form-fitting connection" is understood to mean a connection between two connection partners in which the connection partners interlock or the connection partners indirectly interlock by means of at least one other connection partner.

Different designs of battery shells which have a ventilation element, in particular a semi-permeable membrane, are known in the prior art.

In particular, the prior art contains battery shells made of a plastics material or battery shells made of metal, with ventilation elements for flange mounting and ventilation elements for plug-in mounting being known.

In addition to a semi-permeable membrane, the previously known ventilation elements mainly have between 4 and 10 components and are usually sealed off from the battery shell as a common assembly by means of a separate seal, in particular in the form of an O-ring or in the form of a cord seal.

In many cases, the ventilation elements from the prior art have a separate ventilation element housing which receives the ventilation element and is formed from copper, metal or a plastics material.

Battery shells, in particular battery shells for a traction battery, are therefore known in the prior art which can be aerated and/or ventilated in a designated manner by means of a ventilation element form-fittingly connected to the battery shell.

Deviating from the prior art, a battery shell is proposed here which is formed from a plastics material and has a semi-permeable membrane as an aeration element and/or ventilation element, the semi-permeable membrane being integrally bonded or frictionally connected to the battery shell.

The semi-permeable membrane is preferably designed to be permeable to a gaseous substance and impermeable to a liquid substance at least up to a critical pressure difference.

The semi-permeable membrane is particularly preferably designed to be permeable to a gas mixture which corresponds to or resembles air and to be impermeable to a mixture of substances which corresponds to or resembles water, at least up to a critical pressure difference.

The semi-permeable membrane is particularly preferably designed to be permeable to any gaseous substance and impermeable to any liquid substance, at least up to a critical pressure difference.

Thus, a battery shell formed from a plastics material is proposed which has a semi-permeable membrane, the semi-permeable membrane being designed to be permeable to a gaseous substance and impermeable to a liquid substance, at least up to a critical pressure difference, the semi-permeable membrane being integrally bonded or frictionally connected and not form-fittingly connected to the battery shell.

The battery shell proposed here can be used as a component of a battery housing, so that the battery housing can be aerated and ventilated via the semi-permeable membrane.

A battery housing comprising a battery shell according to the first aspect of the invention can be protected against the ingress of liquids, in particular against the ingress of water, at least up to a critical pressure difference, because the semi-permeable membrane connected to the battery shell is designed to be impermeable to a liquid substance, at least up to a critical pressure difference.

Preferably, the battery shell is designed to receive components of a battery so that they can be protected and/or fastened by the battery shell. The battery shell is particularly preferably formed from a polyamide 6 or a glass-fiber-reinforced polyamide 6, as a result of which a particularly rigid and robust battery shell can advantageously be achieved.

A semi-permeable membrane preferably has a round cross-sectional area.

A semi-permeable membrane can preferably also have an elongate extension, with different shapes—in particular an elliptical shape or a shape which can be formed by means of a polygonal curve, in particular a square shape or a rectangular shape—being conceivable for the cross section of the semi-permeable membrane. Furthermore, a shape of the semi-permeable membrane is also conceivable whereby the basic shape can be formed with a polygonal curve, in which case the corners of the polygonal curve can be rounded off.

The battery shell proposed here can have one or preferably also a plurality of semi-permeable membranes.

The proposed design of a battery shell having a semi-permeable membrane which is integrally bonded or frictionally connected to the battery shell makes it possible to dispense with the ventilation element housing known in the prior art because the semi-permeable membrane can be connected directly to the battery shell as an aeration and ventilation element.

Furthermore, additional sealing measures can advantageously be dispensed with, because the semi-permeable membrane can already be advantageously connected circumferentially to the battery housing by means of the integral bond or frictional connection to the battery shell, so that, when the battery shell is used as intended, an exchange of substances between the volume enclosed by the battery housing and the surroundings of the battery housing can take place only via the membrane surface of the semi-permeable membrane of the battery shell.

As a result of the integral bond or frictional connection between the semi-permeable membrane and the battery shell, the number of components required can also be advantageously reduced compared to the prior art; in particular, the proposed solution does not require a separate housing, a separate seal or additional connecting elements for the functional integration of the aeration element and/or the ventilation element.

Overall, compared to the prior art, the solution proposed here can advantageously achieve a lower overall weight, a smaller installation space requirement and lower overall costs, it being possible to reduce the overall costs in particular by means of the reduced costs for the required components and the more economical manufacturing process for the battery shell.

The design of the battery shell proposed here also advantageously allows flexible adaptability with a standardized design of the battery shell. In particular, the aeration capacity and/or the ventilation capacity or the membrane surface of the semi-permeable membrane can be adapted specifically to the application.

Preferably, an adaptation of the membrane surface of the semi-permeable membrane can advantageously be accomplished without the need to adapt a mold for manufacturing the battery shell, in particular by increasing the number of semi-permeable membranes connected to the battery shell.

Among other things, it should be considered that the receiving geometry is designed to receive a plurality of membranes, whereby, instead of the semi-permeable membrane, a plastics barrier can also be integrally bonded or frictionally connected to the receiving geometry, so that the number of semi-permeable membranes used can advantageously be adapted in a cost-effective and application-specific manner.

Furthermore, it should also be considered that the membrane surface of the semi-permeable membrane can be adapted while maintaining the receiving geometry, in particular by varying the ratio of the membrane surface to a surface area possibly overmolded with plastics material.

Among other things, it should also be specifically considered that the semi-permeable membrane is overmolded with a membrane carrier or is integrally bonded to a membrane carrier, and the membrane carrier can also have a parasol mushroom valve.

The semi-permeable membrane is preferably connected directly to the battery shell, the semi-permeable membrane being welded or glued to the battery shell.

A battery shell is proposed here which is directly integrally bonded to a semi-permeable membrane.

In this way, a combination of a semi-permeable membrane and a battery shell that is particularly easy to manufacture and particularly robust can advantageously be achieved.

According to an expedient embodiment, the semi-permeable membrane is at least indirectly connected to the battery shell, the semi-permeable membrane being directly connected to a membrane carrier, and the membrane carrier being frictionally and/or form-fittingly connected to the battery shell.

The embodiment proposed here makes it possible to replace the semi-permeable membrane while retaining the above advantages, in particular the integral bond of the semi-permeable membrane to its immediate surroundings.

The semi-permeable membrane is preferably integrally bonded to the membrane carrier. The membrane carrier can be easily replaced due to its frictional and/or form-fitting connection with the battery shell, as a result of which maintenance and/or repair measures can be carried out more easily and/or more cost-effectively.

Furthermore, it can advantageously be achieved that a design of a battery shell having different configurations for the ventilation of the battery shell, in particular in accordance with different national regulatory provisions, can be implemented simply by varying the membrane carrier without having to adapt the battery shell in each case.

The semi-permeable membrane is expediently welded or glued to the membrane carrier.

In this way, a particularly advantageous integral bond between the membrane carrier and the semi-permeable membrane can be achieved.

According to a likewise expedient embodiment, the membrane carrier is connected to the battery shell by means of a clamping means.

A membrane carrier is preferably connected to the receiving geometry by means of a "clamping means" which is designed to apply a normal force between the membrane carrier and the receiving geometry. A clamping means preferably has a plurality of clamping elements, each of which can bring about a force between the membrane carrier and the receiving geometry. A clamping means is preferably designed in some regions comparably to a locking ring, in particular in the form of a locking ring according to DIN 471, in particular in the region which is designed for the connection between the membrane carrier and the clamping means.

As a result, the semi-permeable membrane can be installed and removed in a particularly advantageous manner.

Optionally, the membrane carrier is pressed into the battery shell.

According to an optional embodiment, the semi-permeable membrane is welded or glued to the battery shell.

In this regard, the following is explained conceptually:

A "welded" connection is understood to mean an integral bond of at least two components, in which the components are mixed with one another at least in a contact region after welding.

A "glued" connection is understood to mean an integral bond of at least two components, in which the components are connected to one another by means of an adhesive. When at least two components are glued together, they are not mixed together.

Preferably, the integral bond should be thought of as welding the formed battery shell and semi-permeable membrane using the initial heat of the battery shell, the semi-permeable membrane preferably being brought into contact with the battery shell which has at least not yet completely solidified after forming.

Furthermore, in the welding process, it should preferably be considered that the semi-permeable membrane is arranged in the mold for forming the battery shell and only then is the battery shell formed, so that the semi-permeable membrane is already integrally bonded to the battery shell when the battery shell is formed.

During the gluing of the battery shell and semi-permeable membrane, it should be considered that a battery shell that has already been formed is at least indirectly connected to a semi-permeable membrane by means of an adhesive.

The region of the receiving geometry which is designed for receiving and connecting the semi-permeable membrane is preferably oriented toward the interior of the designated battery housing. Advantageously, the semi-permeable membrane can be better protected against the effects of external influences by this type of arrangement.

In this way, a cost-effective, robust and reliable integral bond between the battery shell and the semi-permeable membrane can advantageously be achieved.

According to an expedient embodiment, the semi-permeable membrane is pressed into the battery shell.

In this regard, the following is explained conceptually:

"Pressing in" means that a semi-permeable membrane—the semi-permeable membrane preferably being overmolded with a plastics material, in particular being overmolded with a membrane carrier, or being integrally bonded to a membrane carrier—is inserted into a correspondingly designed receiving geometry of the battery shell, the receiving geometry of the battery shell having for this purpose an at least slightly smaller receiving cross section than the corresponding cross section of the semi-permeable membrane, preferably the corresponding cross section of the semi-permeable membrane overmolded with plastics material, in particular the semi-permeable membrane overmolded with a membrane carrier, or the membrane carrier integrally bonded to the semi-permeable membrane, so that a press fit can be achieved between the receiving geometry of the battery shell and, at least indirectly, the semi-permeable membrane for a frictional connection of the battery shell and semi-permeable membrane. The press fit preferably leads to a normal force between the receiving geometry of the battery shell and the semi-permeable membrane, in particular between the receiving geometry of the battery shell and the semi-permeable membrane overmolded with a plastics material, or between the receiving geometry and the membrane carrier, as a result of which a relative movement between the semi-permeable membrane and the battery shell can advantageously be prevented by static friction.

The region of the receiving geometry which is designed for receiving and connecting the semi-permeable membrane is preferably oriented toward the interior of the designated battery housing. Advantageously, the semi-permeable membrane can be better protected against the effects of external influences by this type of arrangement.

A simple and easy-to-maintain connection between the battery shell and the semi-permeable membrane can thus advantageously be achieved.

The concept of a semi-permeable membrane that is frictionally connected to the battery shell can also make it possible to achieve a particularly advantageous application capability, in that the receiving geometry has a plurality of regions that are designed to receive a semi-permeable membrane, and the number of semi-permeable membranes required for the specific application being inserted into the receiving geometry in a frictionally connected manner, while the regions not required for receiving a semi-permeable membrane are integrally bonded or frictionally connected to a blank cover.

The connection between the battery shell and the semi-permeable membrane is preferably designed to release at a defined pressure difference, in particular at a pressure difference of more than 50 mbar, preferably at a pressure difference of more than 30 mbar, particularly preferably at a pressure difference of more than 15 mbar.

In this regard, the following is explained conceptually:

A "pressure difference" is understood to mean the difference in the pressures acting on both sides of the membrane. The pressure difference is a relative variable, the pressure difference being understood as the magnitude of the difference between the pressures acting on both sides of the membrane. If there is a pressure difference of 10 mbar, the pressure on the inner side or the pressure on the outer side of the battery shell can thus be 10 mbar higher than the pressure acting on the deviating surface of the semi-permeable membrane.

The connection between the battery shell and the semi-permeable membrane is preferably designed to release at a pressure difference of more than 200 mbar. The connection between the battery shell and the semi-permeable membrane is preferably designed to release at a pressure difference of more than 150 mbar. The connection between the battery shell and the semi-permeable membrane is preferably designed to release at a pressure difference of more than 100 mbar. The connection between the battery shell and the semi-permeable membrane is preferably designed to release at a pressure difference of more than 70 mbar. The connection between the battery shell and the semi-permeable membrane is preferably designed to release at a pressure difference of more than 60 mbar. The connection between the battery shell and the semi-permeable membrane is preferably designed to release at a pressure difference of more than 40 mbar. The connection between the battery shell and the semi-permeable membrane is preferably designed to release at a pressure difference of more than 20 mbar.

It should be expressly noted that the above values for the pressure difference should not be understood as strict limits; rather, it should be possible to exceed or fall below them on an engineering scale without departing from the described aspect of the invention. In simple terms, the values are intended to provide an indication of the magnitude of the pressure difference proposed here.

A battery shell can advantageously be provided in this way, whereby, when the battery shell is used as a component of a battery housing as intended, the integrated semi-permeable membrane is designed to release from the receiving geometry at a defined critical pressure difference, which can advantageously prevent the battery housing from bursting. Such critical pressure differences may be the result of a critical event, in particular an overheating of the battery. The battery shell proposed here thus advantageously allows any damage to be contained if such an event occurs.

A battery shell is therefore proposed here in which the integral bond or frictional connection fails at the defined pressure difference between the battery shell and the semi-permeable membrane.

The semi-permeable membrane and/or the receiving geometry are preferably designed in such a way that the semi-permeable membrane releases in the direction of the designated battery housing interior.

The semi-permeable membrane and/or the receiving geometry are preferably designed in such a way that the semi-permeable membrane releases in the direction of the designated battery housing surroundings.

According to a first variant, it is specifically proposed that a frictional connection is designed by means of the corresponding geometry and/or the corresponding material selection in such a way that the frictional connection between the battery shell and the semi-permeable membrane reversibly fails when the defined critical pressure difference is reached, causing the semi-permeable membrane to be released from the receiving geometry. According to this expedient embodiment, it can be achieved in a particularly advantageous manner that the released semi-permeable membrane can be reinserted into the receiving geometry, as a result of which the frictional connection between the semi-permeable membrane and the battery shell can be restored with advantageously little effort.

According to a second variant, the adhesive of an integral bond created by means of an adhesive between the semi-permeable membrane and the battery shell can be dimensioned and/or selected such that the integral bond created by means of adhesive releases when the defined critical pressure difference is reached. In this case, too, the connection between the semi-permeable membrane and the battery shell can be restored, preferably by replacing the adhesive layer used for the connection.

According to a third variant, with a welded connection between the semi-permeable membrane and the battery shell, the receiving geometry and/or the semi-permeable membrane can be selected and/or designed in such a way that the semi-permeable membrane ruptures, as a result of which the gas exchange between the interior of the battery housing and the surroundings of the battery housing is less inhibited, thereby preventing bursting of the battery housing. In this expedient embodiment of the battery shell proposed here, it is not the connection between the semi-permeable membrane and the battery shell that fails when the defined critical pressure difference is reached, but rather it is the semi-permeable membrane that fails.

The semi-permeable membrane expediently has a predetermined breaking point, the predetermined breaking point being designed to burst at a defined pressure difference, in particular at a pressure difference of more than 50 mbar, preferably at a pressure difference of more than 30 mbar, particularly preferably at a pressure difference of more than 15 mbar.

In this regard, the following is explained conceptually:

A "predetermined breaking point" is understood to mean a point of the semi-permeable membrane which is determined by a special structure, shape or design and which breaks in a predictable manner when loaded or overloaded, and breaks in particular in a predictable manner when a defined critical pressure difference is reached.

In other words, a semi-permeable membrane is designed by means of a particular structure, shape or design to break in a predictable manner at a defined pressure difference.

A predetermined breaking point preferably has a material taper, in particular a notch, so that the semi-permeable membrane does not have a constant thickness over its extension, at least in the region of the material taper. In particular, a notch effect acting in the region of the material taper can lead to the semi-permeable membrane breaking in a predictable manner in the event of overload.

"Burst" means the irreversible failure of the semi-permeable membrane, in particular due to a defined rupturing of the membrane.

The connection between the battery shell and the semi-permeable membrane is preferably designed to release at a pressure difference of more than 200 mbar. The connection between the battery shell and the semi-permeable membrane is preferably designed to release at a pressure difference of more than 150 mbar. The connection between the battery shell and the semi-permeable membrane is preferably designed to release at a pressure difference of more than 100 mbar. The connection between the battery shell and the semi-permeable membrane is preferably designed to release at a pressure difference of more than 70 mbar. The connection between the battery shell and the semi-permeable membrane is preferably designed to release at a pressure difference of more than 60 mbar. The connection between the battery shell and the semi-permeable membrane is preferably designed to release at a pressure difference of more than 40 mbar. The connection between the battery shell and the semi-permeable membrane is preferably designed to release at a pressure difference of more than 20 mbar.

It should be expressly noted that the above values for the pressure difference should not be understood as strict limits; rather, it should be possible to exceed or fall below them on an engineering scale without departing from the described aspect of the invention. In simple terms, the values are intended to provide an indication of the magnitude of the pressure difference proposed here.

Advantageously, it can be achieved in this way that the semi-permeable membrane ruptures in a defined manner when a defined critical pressure difference is reached and thus fails, as a result of which a pressure equalization between the two sides of the semi-permeable membrane can be established more quickly. When the battery shell proposed here is used as intended as part of a battery housing, it can be advantageously achieved that the pressure in the battery housing does not rise to a level that can structurally endanger the battery housing.

Optionally, the receiving geometry has a bursting means, the semi-permeable membrane and the bursting means being designed such that the semi-permeable membrane comes into an operative connection with the bursting means at a defined pressure difference so that the semi-permeable membrane bursts, in particular at a pressure difference of more than 50 mbar, preferably at a pressure difference of more than 30 mbar, particularly preferably at a pressure difference of more than 15 mbar.

In this regard, the following is explained conceptually:

A "bursting means" is understood to mean any structural means that allows an irreversible failure of the semi-permeable membrane under defined conditions.

A bursting means is preferably understood to mean a pointed geometry of the receiving geometry, which is designed to cause the semi-permeable membrane to rupture at a defined elastic deformation of the semi-permeable membrane.

The connection between the battery shell and the semi-permeable membrane is preferably designed to release at a pressure difference of more than 200 mbar. The connection between the battery shell and the semi-permeable membrane is preferably designed to release at a pressure difference of more than 150 mbar. The connection between the battery shell and the semi-permeable membrane is preferably designed to release at a pressure difference of more than 100 mbar. The connection between the battery shell and the semi-permeable membrane is preferably designed to release at a pressure difference of more than 70 mbar. The connection between the battery shell and the semi-permeable membrane is preferably designed to release at a pressure difference of more than 60 mbar. The connection between the battery shell and the semi-permeable membrane is preferably designed to release at a pressure difference of more than 40 mbar. The connection between the battery shell and the semi-permeable membrane is preferably designed to release at a pressure difference of more than 20 mbar.

It should be expressly noted that the above values for the pressure difference should not be understood as strict limits; rather, it should be possible to exceed or fall below them on an engineering scale without departing from the described aspect of the invention. In simple terms, the values are intended to provide an indication of the magnitude of the pressure difference proposed here.

It is proposed here that the receiving geometry has a bursting means. If the pressure difference acting on both sides of the semi-permeable membrane increases, the semi-permeable membrane is deformed by the compressive force acting on it, as a result of which the semi-permeable membrane bulges on one side. The bulging of the semi-permeable membrane increases as the pressure difference increases. The bursting means proposed here is dimensioned and/or arranged in such a way that, when the defined critical pressure difference is reached, the semi-permeable membrane comes into an operative connection with the bursting means in such a way that the bursting means initiates rupturing of the membrane.

Preferably, the bursting means is formed and/or arranged to operatively connect to the semi-permeable membrane when the semi-permeable membrane bulges toward the designated battery housing interior volume.

Preferably, the bursting means is formed and/or arranged to operatively connect to the semi-permeable membrane when the semi-permeable membrane bulges toward the surroundings of the designated battery housing.

Advantageously, it can be achieved in this way that the semi-permeable membrane ruptures when a defined critical pressure difference is reached, thereby being able to prevent a structural failure of the designated battery housing.

According to a preferred embodiment, the receiving geometry has no undercut.

In this regard, the following is explained conceptually:

An "undercut" is understood to mean a design element that can prevent a component from being demolded in the main demolding direction. In other words, a component is "free of an undercut" if it can be demolded in the main demolding direction.

A battery shell that is free of undercuts, in particular in the region of the receiving geometry, can be demolded in its main demolding direction.

In other words, a battery shell is proposed here comprising a receiving geometry that can be demolded in the main demolding direction relative to its parting plane of the mold for forming the battery shell, whereby the mold does not need to have a slider for handling any undercuts.

Advantageously, this means that the battery shell proposed here can be manufactured comparatively inexpensively.

The receiving geometry preferably has one support rib, preferably two support ribs, particularly preferably more than two support ribs.

In this regard, the following is explained conceptually:

A "support rib" is understood to mean a rib, in particular a rib formed in the receiving geometry, which is designed to support the membrane, at least on one side, when a pressure difference occurs, in particular a pressure difference that leads to a deformation of the semi-permeable membrane in the direction of the support rib, so that the deformation is at least reduced, at least in the region of any direct contact between the semi-permeable membrane and the support rib.

The longitudinal extent of a support rib is preferably greater than the transverse extent of the support rib.

The receiving geometry preferably has three support ribs, more preferably four support ribs, more preferably still five support ribs and, in addition, preferably six support ribs. According to a preferred embodiment, the receiving geometry has seven support ribs, more preferably eight support ribs, more preferably still nine support ribs and, in addition, preferably ten support ribs. According to an expedient and preferred embodiment, the receiving geometry has more than ten support ribs.

It should be expressly noted that the above values for the number of support ribs should not be understood as strict limits; rather, it should be possible to exceed or fall below them on an engineering scale without departing from the described aspect of the invention. In simple terms, the values are intended to provide an indication of the number of support ribs proposed here.

Advantageously, the support rib or ribs can be used to influence the deformation that occurs in the semi-permeable membrane that is subjected to a pressure difference, thereby requiring less installation space.

Furthermore, with one or more support ribs it can advantageously be achieved that a semi-permeable membrane can withstand a comparatively greater pressure difference before it irreversibly fails.

One or more support ribs can also advantageously contribute to an asymmetrical membrane or a non-circular membrane being able to have a more homogeneous load profile, because the load profile in the semi-permeable membrane can be influenced by supporting the semi-permeable membrane via one or more support ribs, as a result of which even more complex geometries of semi-permeable membranes can advantageously be used. This can advantageously increase the application-specific adaptability.

According to a particularly expedient embodiment, the ventilation opening is designed in the shape of a slit.

In this regard, the following is explained conceptually:

A "slit-shaped" ventilation opening is understood to mean a ventilation opening of which the longitudinal extension is greater than the transverse extension of the ventilation opening. The longitudinal extension is preferably at least twice as large as the transverse extension, preferably at least three times as large, particularly preferably at least four times as large.

Advantageously, this can make it more difficult for stones or dirt to penetrate through the slit-shaped ventilation opening in the receiving geometry.

In particular, this can prevent dirt particles and/or stones from the surroundings of the designated battery housing from penetrating into the semi-permeable membrane and damaging it.

The ventilation opening is particularly preferably arranged in a depression in the receiving geometry.

In this regard, the following is explained conceptually:

A "depression" is understood to mean a recess in the receiving geometry, in particular a recess in the receiving geometry on the outer side of the battery shell.

Advantageously, this means that a water jet or a materially different liquid jet can hit the semi-permeable membrane directly from the surroundings of the designated battery housing without having been deflected beforehand and thus without losing kinetic energy beforehand, as a result of which potential damage to a semi-permeable membrane can be counteracted.

According to an optional embodiment, the semi-permeable membrane is overmolded with a plastics material, in particular with a membrane carrier, and in particular the semi-permeable membrane is overmolded with polyethylene.

In this regard, the following is explained conceptually:

A semi-permeable membrane "overmolded" with a plastics material is understood to mean a semi-permeable membrane which is at least partially encased by a plastics material.

"Polyethylene" is understood to mean all known types of polyethylene, in particular high-density polyethylene (PE-HD), linear low-density polyethylene (PE-LLD) and low-density polyethylene (PE-LD).

By overmolding the semi-permeable membrane with plastics material, a self-sealing frictional connection between the battery shell and the semi-permeable membrane overmolded with plastics material can be achieved, which can be effected without a seal by pressing the semi-permeable membrane overmolded with plastics material into the receiving geometry.

Polyethylene advantageously has good sliding properties, so that the overmolding of the semi-permeable membrane by means of polyethylene can advantageously achieve a fitting surface of the overmolded semi-permeable membrane which has good sliding properties and can therefore be pressed comparatively easily into the receiving geometry, especially if the receiving geometry of the battery shell suitable for this purpose has an at least slightly smaller receiving cross section than the corresponding cross section of the semi-permeable membrane, preferably the corresponding cross section of the semi-permeable membrane overmolded with plastics material.

Furthermore, the use of polyethylene to overmold the semi-permeable membrane can advantageously ensure that the comparatively soft polyethylene represents a particularly well-sealing contact material, so that a particularly well-sealed frictional connection can be achieved between the semi-permeable membrane and the battery shell, especially in combination with a comparatively stiff receiving geometry, in particular through a receiving geometry made of polyamide 6, particularly preferably through a receiving geometry made of glass-fiber-reinforced polyamide 6.

Optionally, it is also conceivable that the semi-permeable membrane is integrally bonded to a membrane carrier, in particular a membrane carrier made of polyethylene.

The battery shell preferably has a parting plane, the receiving geometry being arranged in the battery shell in such a way that the receiving geometry extends substantially in parallel with the parting plane of the battery shell.

In this regard, the following is explained conceptually:

The "parting plane" of the battery shell is understood to mean the plane of the battery shell in which the mold for forming the battery shell can be opened.

A receiving geometry extending "substantially in parallel with the parting plane" is understood to mean that the plane of the receiving geometry, which is designed for connection to the semi-permeable membrane, extends substantially in parallel with the parting plane of the battery shell.

If the parting plane and the plane of the receiving geometry do not run parallel to one another, the angle between the intersecting planes is preferably less than 10°, preferably less than 5°, particularly preferably less than 2°.

It should be expressly noted that the above values for the angles between the planes should not be understood as strict limits; rather, it should be possible to exceed or fall below them on an engineering scale without departing from the described aspect of the invention. In simple terms, the values are intended to provide an indication of the size of the angle proposed here.

In principle any arrangement of the receiving geometry in the battery shell can be chosen or the arrangement can be chosen according to functional or safety-related aspects.

A receiving geometry that runs substantially parallel to the parting plane of the battery shell can advantageously ensure that the battery shell can be demolded without undercuts when the receiving geometry, which is comparatively complex as a result of functional requirements, is suitable designed, as a result of which the manufacturing costs for the battery shell proposed here can be reduced.

According to a particularly expedient embodiment, the battery shell has an inner side, the semi-permeable membrane being arranged on the inner side of the battery shell.

In this regard, the following is explained conceptually:

The “inner side” of the battery shell is understood to mean the side that is situated on the inner side of the battery housing during the use of the battery shell as intended.

In this way, it can advantageously be achieved that a support rib structure and/or a protective region of the receiving geometry can be used more effectively during functional evaluation.

In particular, the protective region of the receiving geometry can better protect the membrane from external influences. Furthermore, in the event of overpressure in the interior of the designated battery housing, a support rib can support a designated deformation of the semi-permeable membrane that occurs particularly well, provided that the semi-permeable membrane is arranged on the inner side of the battery shell.

The battery shell expediently has an outer side, the semi-permeable membrane being arranged on the outer side of the battery shell.

In this way, it can advantageously be achieved that the semi-permeable membrane is accessible from the outer side of the battery shell and can thus be replaced particularly easily.

The battery shell preferably has a parasol mushroom valve, in particular the receiving geometry has a parasol mushroom valve, in particular the membrane carrier has a parasol mushroom valve.

In the event of high overpressures in the interior of the battery shell, the parasol mushroom valve can be used to ensure rapid ventilation of the battery shell. In particular, in the event of a thermal escalation of a battery module, a parasol mushroom valve can ensure that the volume of gas released in the interior of the battery shell can flow out of the battery shell quickly, so that no structurally critical internal pressure can develop.

The battery shell particularly expediently has a protective cover.

The protective cover proposed here is designed to keep mechanical loads away from the semi-permeable membrane and, where applicable, a parasol mushroom valve. The protective cover is designed in such a way that there is a flow channel between the protective cover and the battery shell, so that gas exchange is made possible from the interior of the battery shell through the semi-permeable membrane to the surroundings of the battery shell, in particular to the surroundings of the battery shell outside of the protective cover.

The protective cover is preferably designed to increase the electromagnetic compatibility of the battery shell.

Optionally, the protective cover has a bursting means.

Advantageously, it can be achieved that a semi-permeable membrane deflected in the direction of the protective cover bursts at a defined deflection and thus at a defined pressure difference and thus has a lower flow resistance for rapid pressure reduction in the interior of the battery shell.

The protective cover preferably has a contacting element.

A contacting element is designed for an electrical connection to a further component. As a result, an existing element can advantageously be supplemented by the protective cover to increase electromagnetic compatibility, in particular by the electrical connection between the existing element and the protective cover, in particular by means of the contacting element.

According to one aspect of the invention, the object is achieved by a battery housing, in particular a battery housing for a traction battery for a motor vehicle comprising a battery shell having the features of claim 1, and preferred embodiments can be achieved by a battery shell having the features of any claim dependent on claim 1.

It goes without saying that the above-described advantages of a battery shell extend directly to a battery housing, in particular a battery housing for a traction battery for a motor vehicle having such a battery shell.

It should be expressly noted that the subject matter of this aspect can advantageously be combined with the subject matter of the aforementioned first aspect of the invention, both individually and cumulatively in any combination.

According to a second aspect of the invention, the object is achieved by a traction battery, in particular a traction battery for a motor vehicle, comprising a battery shell having the features of claim 1, and preferred embodiments can be achieved by a battery shell having the features of any claim dependent on claim 1.

It goes without saying that the advantages of a battery shell described above extend directly to a traction battery, in particular a traction battery for a motor vehicle having such a battery shell.

It should be expressly noted that the subject matter of the second aspect can advantageously be combined with the subject matter of the preceding aspects of the invention, both individually or cumulatively in any combination.

According to a third aspect of the invention, the object is achieved by a motor vehicle comprising a battery shell having the features of claim 1, and preferred embodiments can be achieved by a battery shell having the features of any claim dependent on claim 1.

In this regard, the following is explained conceptually:

A “motor vehicle” is understood to mean a vehicle driven by a motor. A motor vehicle is preferably not mounted on a rail or at least not permanently track-mounted.

It goes without saying that the above-described advantages of a battery shell extend directly to a motor vehicle which has such a battery shell.

It should be expressly noted that the subject matter of the third aspect can advantageously be combined with the subject matter of the preceding aspects of the invention, both individually and cumulatively in any combination.

According to a fourth aspect of the invention, the object is achieved by a method for manufacturing a battery shell, in particular a battery shell having the features of claim 1, and preferred embodiments can be achieved by a battery shell having the features of any claim dependent on claim 1, comprising the following steps:

forming the battery shell from a plastics material;
providing a semi-permeable membrane; and
integrally bonding or frictionally connecting the formed battery shell and the semi-permeable membrane.

In this regard, the following is explained conceptually:

"Forming" should be understood to mean any shaping of a body by means of which a three-s dimensional form can be achieved, in particular a three-dimensionally formed battery shell.

Forming should preferably be understood to mean forming by means of an injection molding process.

Forming should preferably be understood to mean forming by means of a compression molding process. In this case, a molding material is introduced into a cavity of a die, the die having been heated or being heated. The cavity is then closed using a pressure piston. The pressure gives the molding material the shape specified by the cavity and pressure piston.

"Connecting" is understood to mean any method that is designed for integrally bonding or frictionally connecting the battery shell and semi-permeable membrane.

Integral bonding should preferably be thought of as a connection by means of a welding process. Particularly preferably, the integral bonding should be thought of as welding the formed battery shell and semi-permeable membrane using the initial heat of the battery shell, the semi-permeable membrane preferably being brought into contact with the battery shell which has at least not yet completely solidified after forming. Furthermore, it should preferably be considered that the semi-permeable membrane is arranged in the mold for forming the battery shell and only then is the battery shell formed, so that the semi-permeable membrane is already integrally bonded to the battery shell when the battery shell is formed.

The integral bonding preferably should further be thought of as gluing the battery shell and the semi-permeable membrane.

A frictional connection should be thought of in particular as pressing the semi-permeable membrane into a correspondingly designed receiving geometry of the battery shell, the semi-permeable membrane preferably being overmolded with a plastics material. For this purpose, the receiving geometry of the battery shell preferably has an at least slightly smaller receiving cross section than the corresponding cross section of the semi-permeable membrane, preferably the corresponding cross section of the semi-permeable membrane overmolded with plastics material, so that a press fit between the receiving geometry of the battery shell and the semi-permeable membrane ensures a frictional connection of the battery shell and semi-permeable membrane.

The frictional connection should preferably be thought of as pressing the membrane carrier comprising a semi-permeable membrane into a correspondingly designed battery shell.

It should be expressly noted that the steps of the method can be carried out in the specified order, although this is not required here. The steps can therefore explicitly also be carried out in a different order. In particular, it should be considered, among other things, that the semi-permeable membrane is provided, then the battery shell is formed, and at the same time or subsequently an integral bond is brought about between the semi-permeable membrane and the battery shell.

Advantageously, a battery shell, in particular a battery shell having the features of claim 1, can be manufactured using the method proposed here, and preferred embodiments can be achieved by a battery shell having the features of any claim dependent on claim 1.

It goes without saying that the advantages of a battery shell described above extend directly to methods for manufacturing such a battery shell.

Figure 2:
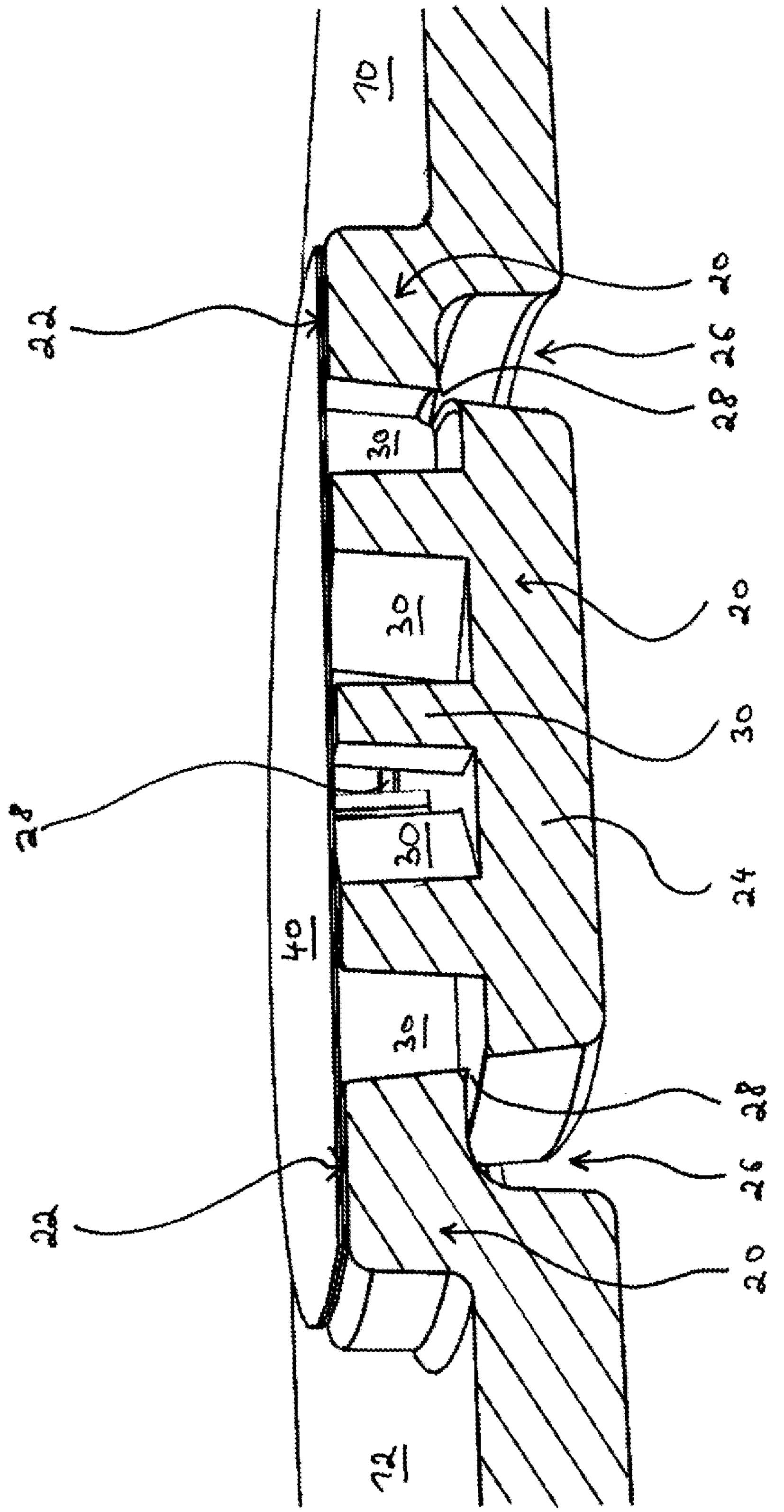
Figure 3:
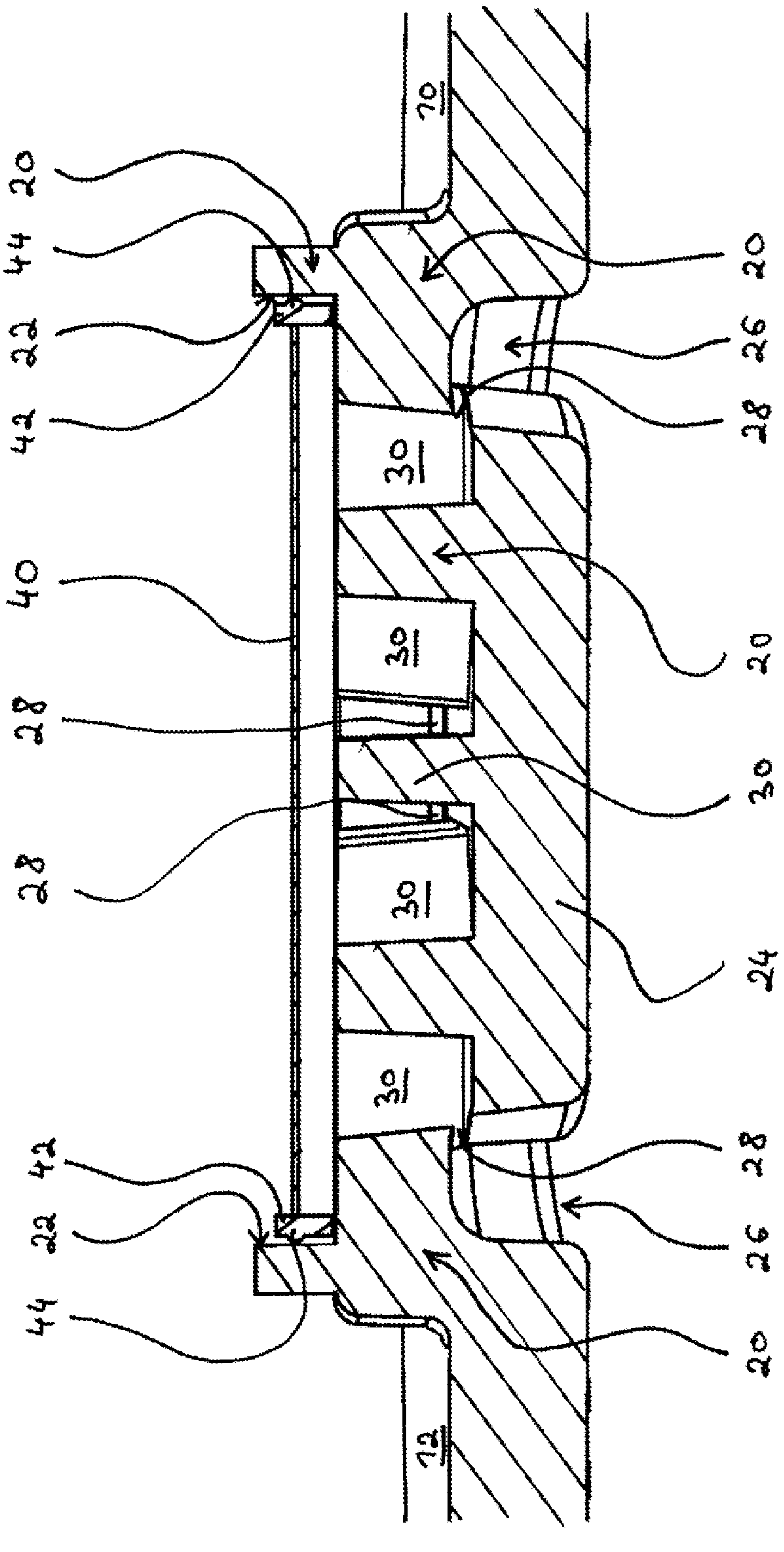
Figure 4:
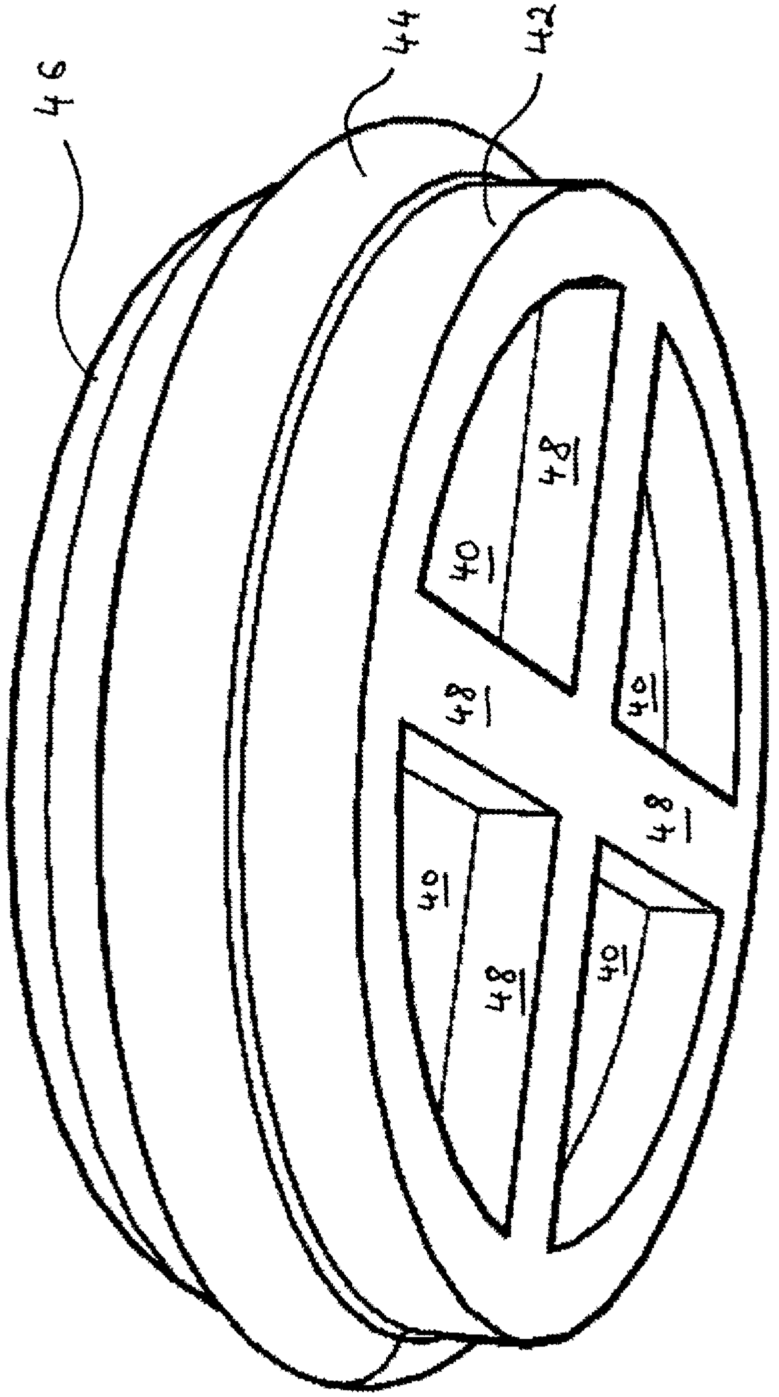
Figure 5:
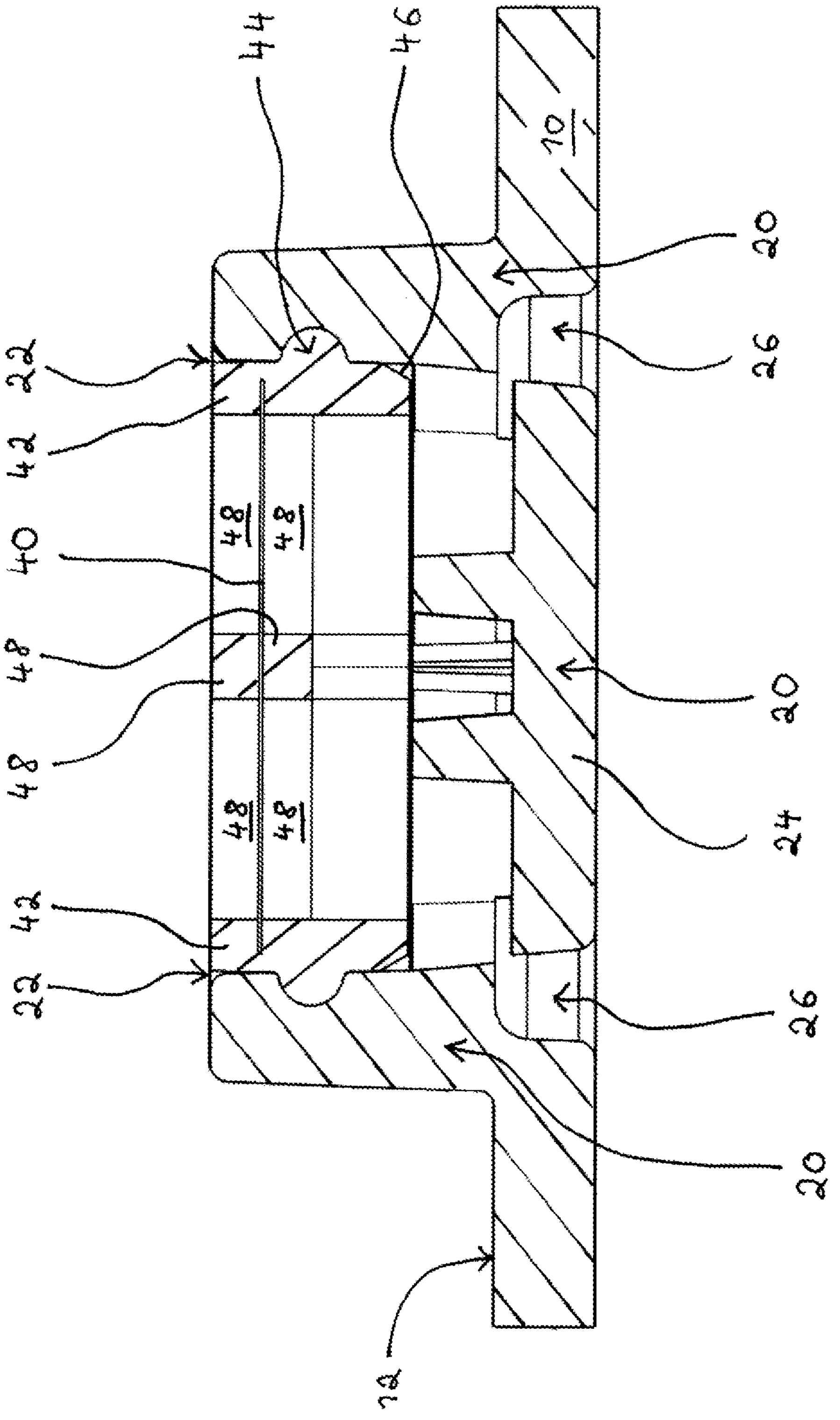
Figure 6:
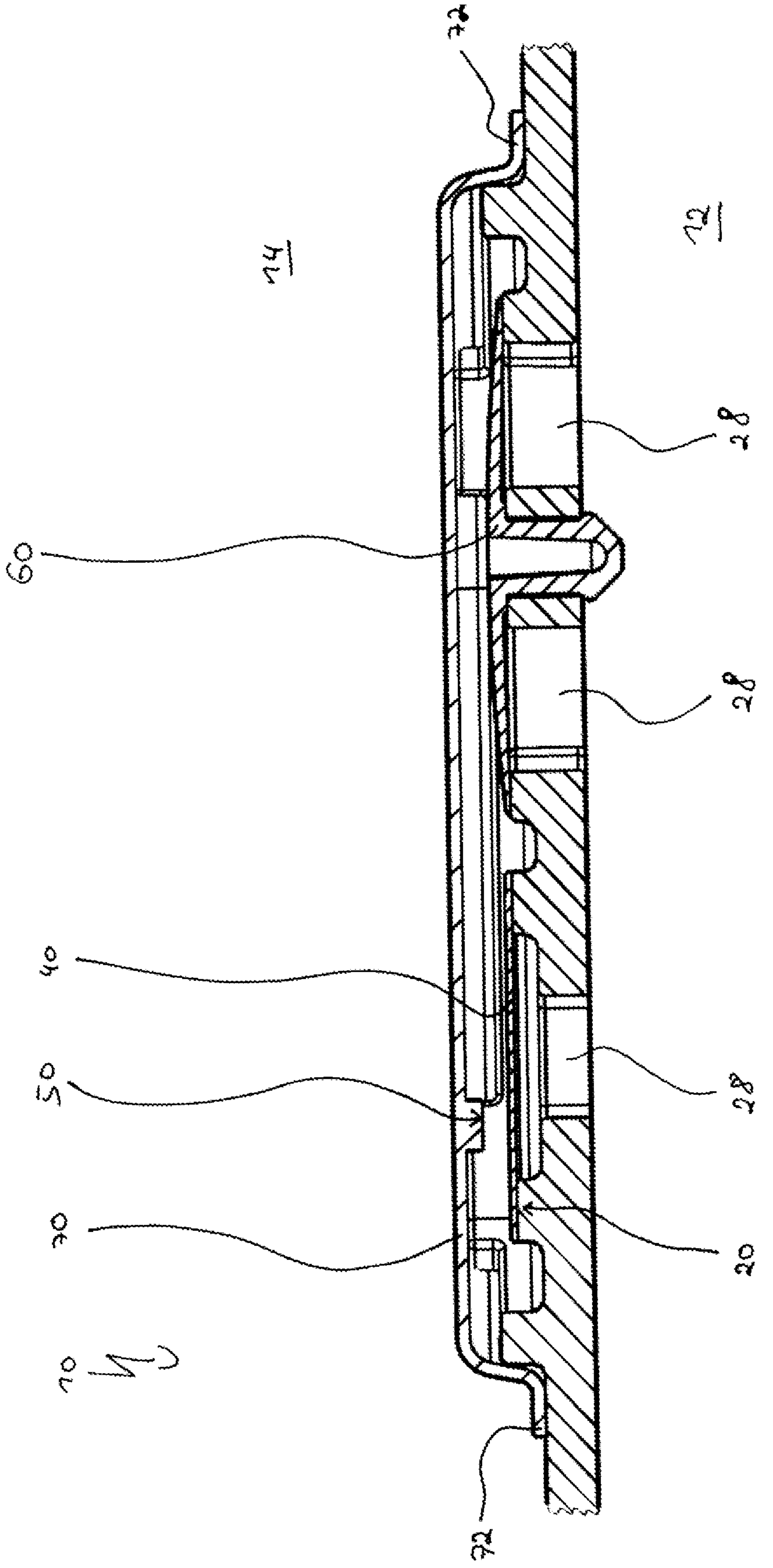
Figure 7:
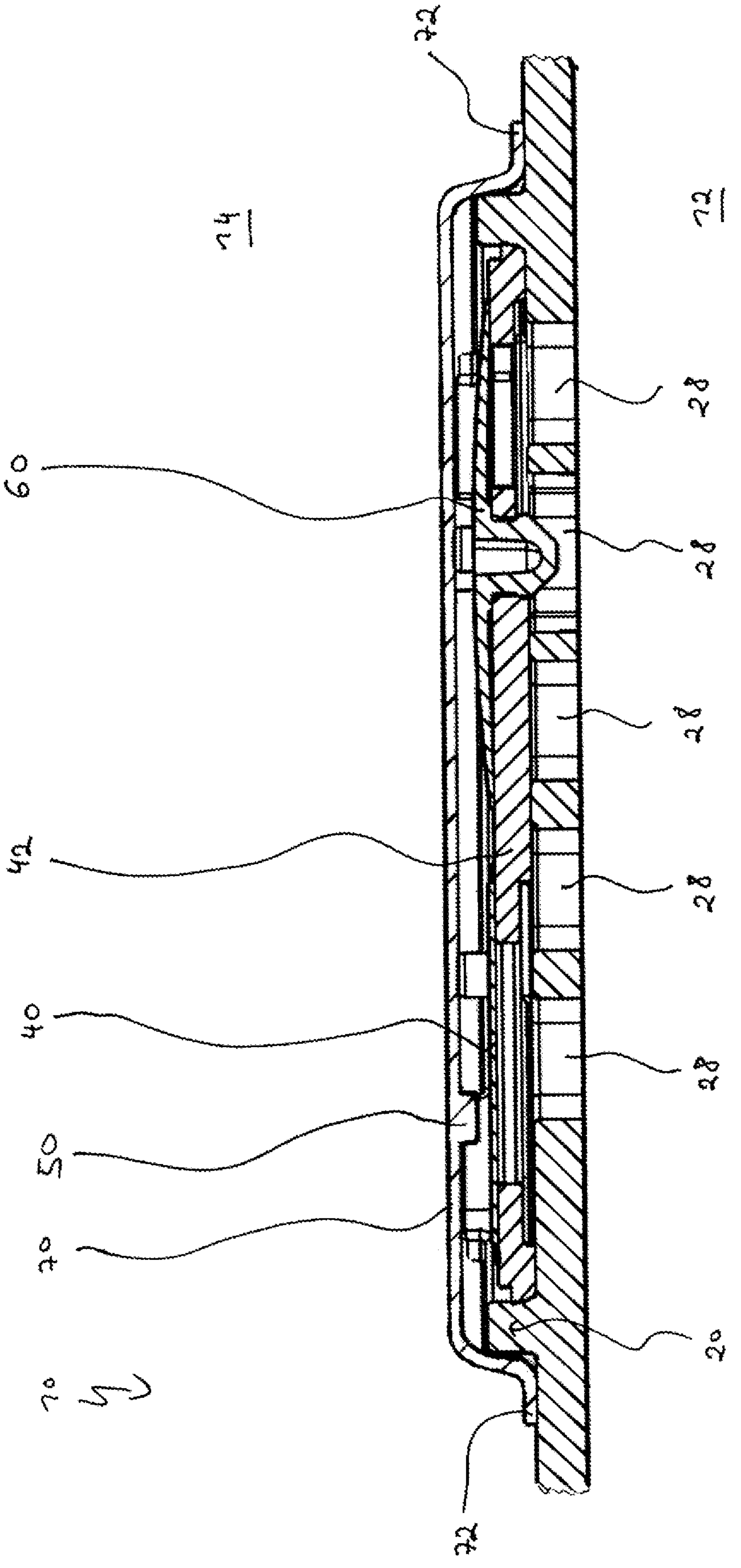
Figure 8:
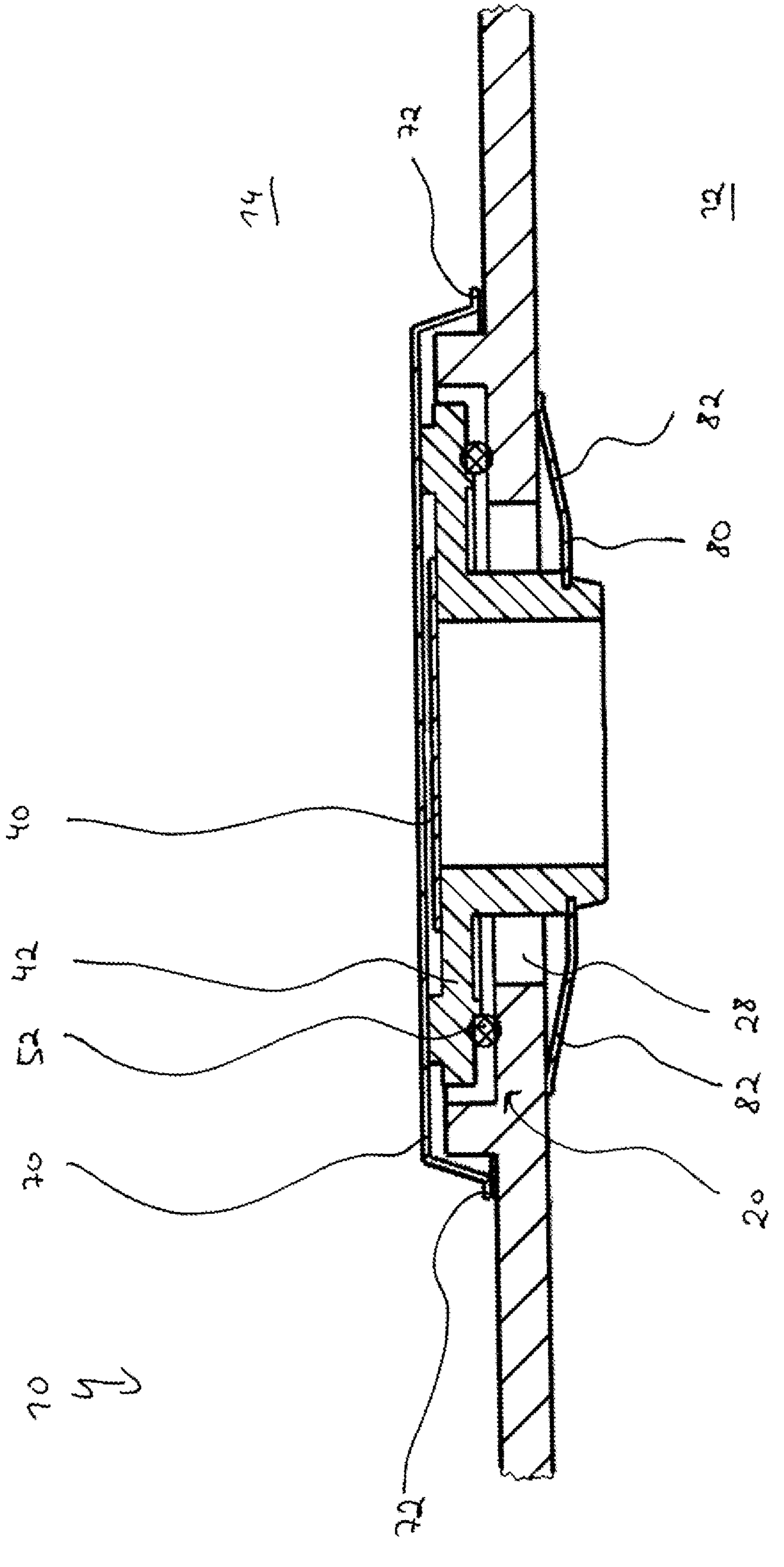

Further advantages, details and features of the invention can be found below in the described embodiments. The drawings show, in detail, the following:

FIG. 1: a schematic exploded view in section of a region of a battery shell according to a first embodiment comprising a receiving geometry and a semi-permeable membrane;

FIG. 2: a schematic sectional view of a region of a battery shell according to the first embodiment comprising a receiving geometry and a semi-permeable membrane;

FIG. 3: a schematic sectional view of a region of a battery shell according to a second embodiment comprising a receiving geometry and a semi-permeable membrane overmolded with plastics material;

FIG. 4: a schematic view of a semi-permeable membrane overmolded with plastics material;

FIG. 5: a schematic sectional view of a region of a battery shell according to a third embodiment comprising a receiving geometry and a semi-permeable membrane overmolded with plastics material;

FIG. 6: a schematic sectional view of a region of a battery shell according to a further embodiment comprising a receiving geometry, a semi-permeable membrane and a parasol mushroom valve;

FIG. 7: a schematic sectional view of a region of a battery shell according to a further embodiment, comprising a receiving geometry and a membrane carrier comprising a semi-permeable membrane and a parasol mushroom valve; and FIG. 8: a schematic sectional view of a region of a battery shell according to a further embodiment comprising a receiving geometry and a membrane carrier comprising a semi-permeable membrane.

In the following description, the same reference signs denote the same components or features; in the interest of avoiding repetition, a description of a component made with reference to one drawing also applies to the other drawings. Furthermore, individual features that have been described in connection with one embodiment can also be used separately in other embodiments.

The region of a battery shell 10 according to a first embodiment in FIG. 1 has a receiving geometry 20 and a semi-permeable membrane 40, the semi-permeable membrane 40 being oriented toward the inner side 12 of the battery shell 10 in relation to the receiving geometry 20.

The receiving geometry 20 has no undercut, so that the battery shell 10 can be demolded in the direction (not shown) of the main demolding direction (not shown).

The receiving geometry 20 has a connection region 22 which is designed for an integral bond (not shown) to the semi-permeable membrane 40.

The receiving geometry 20 has a circumferential depression 26 and a protective region 24, the protective region 24 being designed to protect the semi-permeable membrane 40 from external influences (not shown). In other words, the protective region 24 is designed to impede or prevent direct accessibility of the semi-permeable membrane 40 from the outer side (not labeled) of the battery shell 10.

The receiving geometry 20 has a plurality of ventilation openings 28, the ventilation openings 28 being shaped as slits and being designed to aerate and ventilate the semi-permeable membrane 40 from the outer side (not labeled) of the battery shell 10.

The slit-shaped ventilation openings 28 are arranged in the depression 26 so that a direct jet of liquid (not shown) from the outer side (not labeled) of the battery shell 10 can be kept away from the semi-permeable membrane 40.

The receiving geometry 20 has a plurality of support ribs 30 which are designed to support the semi-permeable membrane 40 so that the possible deformation thereof (not shown) can advantageously be limited by the support ribs 30. In this way, among other things, the space required for the receiving geometry 20 can be reduced.

The connection region 22 of the receiving geometry 20 can be connected to the semi-permeable membrane 40 by means of welding (not shown) or gluing (not shown). In the case of gluing (not shown), an adhesive layer (not shown) on the connection region 22 is required for this purpose.

The region of a battery shell 10 according to a first embodiment in FIG. 2 has a receiving geometry 20 and a semi-permeable membrane 40, the semi-permeable membrane 40 being connected to the receiving geometry 20 in the connection region 22.

For this purpose, the connection region 22 has an adhesive layer (not labeled) between the receiving geometry 20 and the semi-permeable membrane 40. However, it should be expressly noted that the semi-permeable membrane 40 and the receiving geometry 20 of the battery shell 10 can also be connected by means of welding (not shown) in the connection region 22 of the receiving geometry 20.

The region of a battery shell 10 according to a second embodiment in FIG. 3 has a receiving geometry 20 and a semi-permeable membrane 40, the semi-permeable membrane 40 being oriented toward the inner side 12 of the battery shell 10 in relation to the receiving geometry 20.

The receiving geometry 20 has no undercut, so that the battery shell 10 can be demolded in the direction (not shown) of the main demolding direction (not shown).

The receiving geometry 20 of the battery shell 10 has a connection region 22 which is designed for a frictional connection (not labeled) between the receiving geometry 20 and, at least indirectly, the semi-permeable membrane 40.

The semi-permeable membrane 40 is overmolded with a plastics material (not labeled), as a result of which the membrane carrier 42 is formed. The membrane carrier 42 of the semi-permeable membrane 40 has a fitting lip 44 which is designed to facilitate the installation (not shown) of the semi-permeable membrane 40 and to increase the leaktightness (not shown) between the membrane carrier 42 of the semi-permeable membrane 40 and the connection region 22 of the receiving geometry 20.

The frictional connection (not labeled) in the connection region 22 of the receiving geometry 20 between the receiving geometry 20 and the membrane carrier 42 of the semi-permeable membrane 40 can advantageously be reversibly released and reconnected.

The receiving geometry 20 has a plurality of support ribs 30 which are designed to support the semi-permeable membrane 40 so that the possible deformation thereof (not shown) can advantageously be limited by the support ribs 30. In this way, among other things, the space required for the receiving geometry 20 can be reduced.

The semi-permeable membrane 40 in FIG. 4 is overmolded with a plastics material (not labeled), the overmolded plastics material (not labeled) having a geometry (not labeled) which forms a membrane carrier 42, a fitting lip 44, a chamfer 46 and a membrane reinforcement 48.

The membrane carrier 42 and the membrane reinforcement 48 are designed to receive and reinforce the semi-permeable membrane 40.

The membrane carrier 42 has a fitting lip 44 which is designed to facilitate the installation (not shown) of the semi-permeable membrane 40 and to increase the leaktightness (not shown) between the membrane carrier 42 of the semi-permeable membrane 40 and the designated connection region (not shown) of the designated receiving geometry (not shown).

Furthermore, the membrane carrier 42 has a chamfer 46 which is designed to facilitate the installation (not shown) of the semi-permeable membrane 40 and to center it during installation (not shown).

The region of a battery shell 10 according to a third embodiment in FIG. 5 has a receiving geometry 20 and a semi-permeable membrane 40, the semi-permeable membrane 40 being oriented toward the inner side 12 of the battery shell 10 in relation to the receiving geometry 20.

The semi-permeable membrane 40 is overmolded with a plastics material (not labeled), as a result of which the membrane carrier 42 is formed. The membrane carrier 42 of the semi-permeable membrane 40 has a fitting lip 44 which is designed to increase the leaktightness (not shown) between the membrane carrier 42 of the semi-permeable membrane 40 and the connection region 22 of the receiving geometry 20.

The frictional connection (not labeled) in the connection region 22 of the receiving geometry 20 between the receiving geometry 20 and the membrane carrier 42 of the semi-permeable membrane 40 can advantageously be reversibly released and reconnected, with the fitting lip 44 and the connection region 22 of the receiving geometry 20 of the battery shell 10 allowing an additional form-fitting connection (not labeled).

The membrane carrier 42 of the semi-permeable membrane 40 is preferably overmolded from polyethylene (not labeled), as a result of which a comparatively soft membrane carrier 42 can be achieved. As a result, the membrane carrier 42 can be reversibly connected and released more easily despite the additional form-fit (not labeled). In addition, the leaktightness (not shown) between the membrane carrier 42 and the comparatively stiffly designed receiving geometry 20 in the connection region 22 can thus be increased.

The region of a battery shell 10 in FIG. 6 has a semi-permeable membrane 40 which is integrally bonded and directly connected to the receiving geometry 20 of the battery shell 10.

Furthermore, the region of the battery shell 10 has a parasol mushroom valve 60 which is form-fittingly connected to the receiving geometry 20. In addition to at least one ventilation opening 28 which is in an operative connection with the semi-permeable membrane 40, the receiving geometry 20 has at least one further air guide opening 28 which is in an operative connection with the parasol mushroom valve 60.

The receiving geometry 20 is covered on the outer side 14 of the battery shell 10 with a protective cover 70 which protects the semi-permeable membrane 40 and the parasol mushroom valve 60 from external loads and at the same time improves the electromagnetic compatibility emanating from the battery shell 10. For this purpose, the protective cover 70 has at least one contacting element 72 which is designed for connection to further elements (not shown) to improve the electromagnetic compatibility.

The protective cover 70 has a bursting means 50 which is in an operative connection with the semi-permeable membrane 40 and is designed to burst the semi-permeable membrane 40 at high overpressures on the inner side 12 of the battery shell 10.

The protective cover 70 is form-fittingly and/or frictionally connected to the battery shell 10, in particular to the receiving geometry 20 of the battery shell 10. A flow channel (not labeled) runs at least in regions between the protective cover 70 and the battery shell 10 and is designed for gas exchange between the semi-permeable membrane 40 and/or the parasol mushroom valve 60 as well as the outer side 14 of the battery shell 10.

The region of a battery shell 10 in FIG. 7 is similar to the embodiment according to FIG. 6, but the semi-permeable membrane 40 and the parasol mushroom valve 60 are jointly received by a membrane carrier 42 which is frictionally connected to the receiving geometry 20. Thus, the semi-permeable membrane 40 is connected at least directly by means of the membrane carrier 42 to the battery shell 10.

The membrane carrier 42 also has ventilation openings (not shown/not labeled) which allow a flow exchange between the outer side 14 of the battery shell 10 and the semi-permeable membrane 40 as well as the parasol mushroom valve 60.

The membrane carrier 42 is integrally bonded to the semi-permeable membrane 40 and allows easy replacement of the semi-permeable membrane and/or the parasol mushroom valve 60.

The region of a battery shell 10 in FIG. 8 has a membrane carrier 42 which is integrally bonded to a semi-permeable membrane. The membrane carrier 42 is connected to the battery shell 10 by means of a clamping means 80.

Located between the membrane carrier 42 and the battery shell 10 is a sealing means 52, which is designed to provide sealing between the battery shell 10 and the membrane carrier 42 in normal operating states.

The clamping means 80 has a plurality of clamping elements 82 which extend outwardly in the radial direction in a finger-like manner from the central region of the clamping means 80 and which in turn are in contact with the battery shell 10. Between each of the clamping elements 82 there is a free cross section (not labeled/not shown) which, in the event of a particularly high pressure difference, in particular triggered by a thermal escalation of a battery module, allows the high pressure difference to lift the membrane carrier 42 off the sealing means 52, as a result of which the pressure difference between the inner side 12 and the outer side 14 of the battery shell does not have to be dissipated solely by the semi-permeable membrane 40, but can be dissipated via a bypass channel which opens as a result. The level of the pressure difference required for this can be determined by the design of the clamping means.

Furthermore, the battery shell 10 has a protective cover 70 on the outer side 14.

The protective cover is preferably connected to the membrane carrier 42 and together with the membrane carrier 42 can be fastened in the battery shell 10 by means of the clamping means 80.

A flow channel (not labeled) runs at least in regions between the protective cover 70 and the battery shell 10 and is designed for gas exchange between the semi-permeable membrane 40 and the outer side 14 of the battery shell 10.

In some implementations, the protective region 24 is a solid, plate-like structure that is offset toward the inner side 12 relative to the connection region 22. Because the protective region 24 is offset inward in this manner, the protective region 24 can block direct access to the semi-permeable membrane 40 from the outer side 14 of the battery shell 10. The support ribs 30 extend radially outward from the protective region 24 across the circumferential depression 26 to the connection region 22, and adjacent support ribs 30 define slit-shaped ventilation openings 28 between them. Gas entering the receiving geometry 20 from the outer side 14 passes laterally through the slit-shaped ventilation openings 28 within the circumferential depression 26 before reaching the semi-permeable membrane 40.

LIST OF REFERENCE SIGNS

10 Battery shell
12 Inner side
14 Outer side
20 Receiving geometry
22 Connection region
24 Protective region
26 Depression
28 Ventilation opening
30 Support rib
40 Semi-permeable membrane
42 Membrane carrier
44 Fitting lip
46 Chamfer
48 Membrane reinforcement
50 Bursting means
52 Sealing means
60 Parasol mushroom valve
70 Protective cover
72 Contacting element
80 Clamping means
82 Clamping element

The invention claimed is:

1. A battery shell (10), the battery shell (10) being formed from a plastics material, the battery shell having an inner side (12) and an outer side (14) and a wall extending between the inner side (12) and the outer side (14), the battery shell (10) having a receiving geometry (20) for a semi-permeable membrane (40), the receiving geometry being designed for connection to the semi-permeable membrane (40), wherein the semi-permeable membrane (40) is integrally bonded or frictionally connected to the battery shell (10), wherein the receiving geometry (20) includes:

a connection region (22) and a protective region (24) separated from the connection region (22) by a circumferential depression (26), the connection region (22) being configured for connection to the semi-permeable membrane (40), the protective region (24) being a solid plate-like region offset toward the inner side (12) relative to the connection region (22), the protective region (24) being sized and shaped to block direct access to the semi-permeable membrane (40) from the outer side (14) of the battery shell (10); and a plurality of support ribs (30) integrally formed with the protective region (24) and the connection region (22), each support rib (30) extending radially outward from the protective region (24) across the circumferential depression (26) to the connection region (22), wherein adjacent support ribs (30) define slit-shaped ventilation openings (28) within the circumferential depression (26), the slit-shaped ventilation openings (28) opening laterally into the circumferential depression (26), causing gas entering the receiving geometry (20) from the outer side (14) to pass laterally through the slit-shaped ventilation openings (28) before reaching the semi-permeable membrane (40);

wherein the semi-permeable membrane (40) is arranged on the inner side (12) of the battery shell (10), the semi-permeable membrane (40) being connected to the connection region (22) and covering the protective region (24) and the circumferential depression (26);

wherein a membrane carrier connected to the receiving geometry of the battery shell has a parasol mushroom valve and a semi-permeable membrane or the receiving geometry of the battery shell has a parasol mushroom valve and the semi-permeable membrane; and wherein the semi-permeable membrane and the parasol mushroom valve are arranged in flow channels connected in parallel.

2. The battery shell according to claim 1, wherein the semi-permeable membrane is connected directly to the battery shell, the semi-permeable membrane being welded or glued to the battery shell.

3. The battery shell according to claim 1, wherein the semi-permeable membrane is connected at least indirectly to the battery shell, the semi-permeable membrane being connected directly to the membrane carrier, the membrane carrier being frictionally and/or form-fittingly connected to the battery shell.

4. The battery shell according to claim 3, wherein the semi-permeable membrane is welded or glued to the membrane carrier.

5. The battery shell according to claim 3, wherein the membrane carrier is pressed into the battery shell.

6. The battery shell according to claim 1, wherein the connection between the battery shell and the semi-permeable membrane is designed to release at a defined pressure difference of more than 15 mbar.

7. The battery shell according to claim 1, wherein the semi-permeable membrane has a predetermined breaking point, the predetermined breaking point being designed to burst at a defined pressure difference of more than 15 mbar.

8. The battery shell according to claim 1, wherein the receiving geometry has no undercut.

9. The battery shell according to claim 1, wherein the receiving geometry has more than two support ribs.

10. The battery shell according to claim 1, wherein the semi-permeable membrane is overmolded with a plastic material.

11. The battery shell according to claim 1, wherein the battery shell has a protective cover.

12. The battery shell according to claim 11, wherein the protective cover has a contacting element.

13. A traction battery for a motor vehicle, comprising a battery shell according to claim 1.

14. A motor vehicle comprising a battery shell according to claim 1.

* * * * *